United States Patent [19]
Allred et al.

[11] Patent Number: 5,501,303
[45] Date of Patent: Mar. 26, 1996

[54] SINGLE ACTING TRANSLATIONAL/ROTATIONAL BRAKE

[75] Inventors: Johnny W. Allred, Newport News; Vincent J. Fleck, Jr., Yorktown, both of Va.

[73] Assignee: The United States of America as represented by the Administrator of the National Aeronautics and Space Administration, Washington, D.C.

[21] Appl. No.: 505,054

[22] Filed: Jul. 21, 1995

Related U.S. Application Data

[63] Continuation of Ser. No. 64,324, May 12, 1993, abandoned.
[51] Int. Cl.[6] .............................. F16D 63/00; F16F 9/00
[52] U.S. Cl. ..................... 188/67; 188/70 B; 188/382
[58] Field of Search ..................... 188/67, 70 B, 188/70 R, 72.2, 140 A, 140 R, 342, 78, 135, 136, 141, 71.6, 250 G, 382

[56] References Cited

U.S. PATENT DOCUMENTS

| | | | |
|---|---|---|---|
| 1,928,630 | 10/1933 | Penrose | 188/140 A |
| 2,041,935 | 5/1936 | Kliewer | 188/70 R |
| 2,065,382 | 12/1936 | Levy | 188/140 A |
| 2,086,538 | 7/1937 | Dabney | 188/70 R |
| 2,727,845 | 12/1955 | Bishop | 188/250 G |
| 2,955,680 | 10/1960 | Caero | 188/70 B |
| 3,033,320 | 5/1962 | Edwards | 188/70 R |
| 3,073,424 | 1/1963 | Russell | 188/250 G |
| 3,822,768 | 7/1974 | Sebulke | 188/70 R |
| 4,077,498 | 3/1978 | Brown et al. | 188/72.2 |
| 4,838,391 | 6/1989 | Schenk | 188/70 B |
| 4,901,824 | 2/1990 | Nagano | 188/250 G |
| 5,074,387 | 12/1991 | Antonelli | 188/70 B |

FOREIGN PATENT DOCUMENTS 1178725  4/1962  Germany .............................. 188/70 R

*Primary Examiner*—Douglas C. Butler
*Attorney, Agent, or Firm*—Kimberly A. Chasteen

[57] ABSTRACT

A brake system is provided that applies braking forces on surfaces in both the translational and rotational directions using a single acting self-contained actuator that travels with the translational mechanism. The brake engages a mechanical lock and creates a frictional force on the translational structure preventing translation while simultaneously creating a frictional torque that prevents rotation of the vertical support. The system may include serrations on the braking surfaces to provide increased braking forces.

6 Claims, 6 Drawing Sheets

SINGLE ACTING TRANSLATIONAL/ROTATIONAL BRAKE

ORIGIN OF THE INVENTION

The invention described herein was made by employees of the United States Government and may be used by and for the Government for governmental purposes without the payment of any royalties thereon or therefor.

This is a continuation of application Ser. No. 08/064,324 filed on May 12, 1993, now abandoned.

BACKGROUND OF THE INVENTION

1. Technical Field of the Invention

The present invention relates generally to a brake system and more particularly to a brake system that operates in both the translational and rotational directions by using a single actuator.

2. Discussion of the Related Art

Prior brake methods are complex using ball bushings held by tooth gears, rotating screw jacks, bearings, couplings, drive shafts, belts, and electrical motors with built-in brakes. These components develop backlash, deflect and loosen due to wear after hours of operation.

Other methods use gear racks mounted on a longitudinal or straight track. Locking the gear racks requires an electrical motor and brake configuration, adding considerable weight to the overall system.

Another prior method uses a cable system for positioning and holding the mechanism or support. This method is not satisfactory as the cable will stretch or slip at the pulleys. This method also requires a motor with a built-in brake.

Another prior method incorporated a self-contained motor, hydraulic pump, hydraulic linear cylinder and electro-hydraulic valves to apply a force to prevent translation. These units are heavy and are difficult to adapt to small confined spaces. There is also the possibility of fluid leakage after hours of operation due to seal wear.

A disadvantage common to all prior methods is the requirement for one or more actuators, or cylinders, to provide braking forces for each degree of freedom.

It is accordingly an object of the present invention to provide a simple braking system that can apply braking forces in both the translational and rotational direction.

It is a further object of the present invention to provide a simple braking system that requires only one actuator to apply both translational and rotational braking forces.

It is a further object of the present invention to provide braking forces close to the applied loads.

It is another object of the present invention to provide ease of operation through control of the actuator.

It is another object of the present invention to provide minimum cross-sectional area to reduce air flow blockage when used in a wind tunnel.

Additional objects and advantages of the present invention are apparent from the drawings and specification that follow.

SUMMARY OF THE INVENTION

This invention relates to a unique single action translational/rotational brake for mechanisms or supports that move in straight lines as well as rotationally at any point along that straight line. Such mechanisms are used in positioning systems. One such system prevents translation and rotation of an airplane model in a wind tunnel where the model is tested for aerodynamic and centrifugal loads while the model is rotated about its center of gravity and while it is in a spin mode of operation. The model is required to be positioned and held at test conditions such as angle of attack before the start of the spin testing. The single acting brake engages a mechanical lock and creates a frictional force on the translational structure preventing translation while simultaneously creating a frictional torque that prevents rotation of the vertical support. This invention saves considerable time, space and equipment for the brake operation since the applied force from the actuator prevents rotation and the reaction force prevents translation of the mechanism or any other similar positioning system. Conical surfaces are used for the rotational braking surfaces and flat surfaces are used for the translational braking surfaces. Both surfaces are engaged by use of a single stroke of the actuator and may be serrated to resist large surface forces. This invention is easily expanded to hold more than the two degrees of freedom motion which is discussed herein by the use of the single acting actuator.

DETAILED DESCRIPTION OF THE INVENTION

Figure 1:
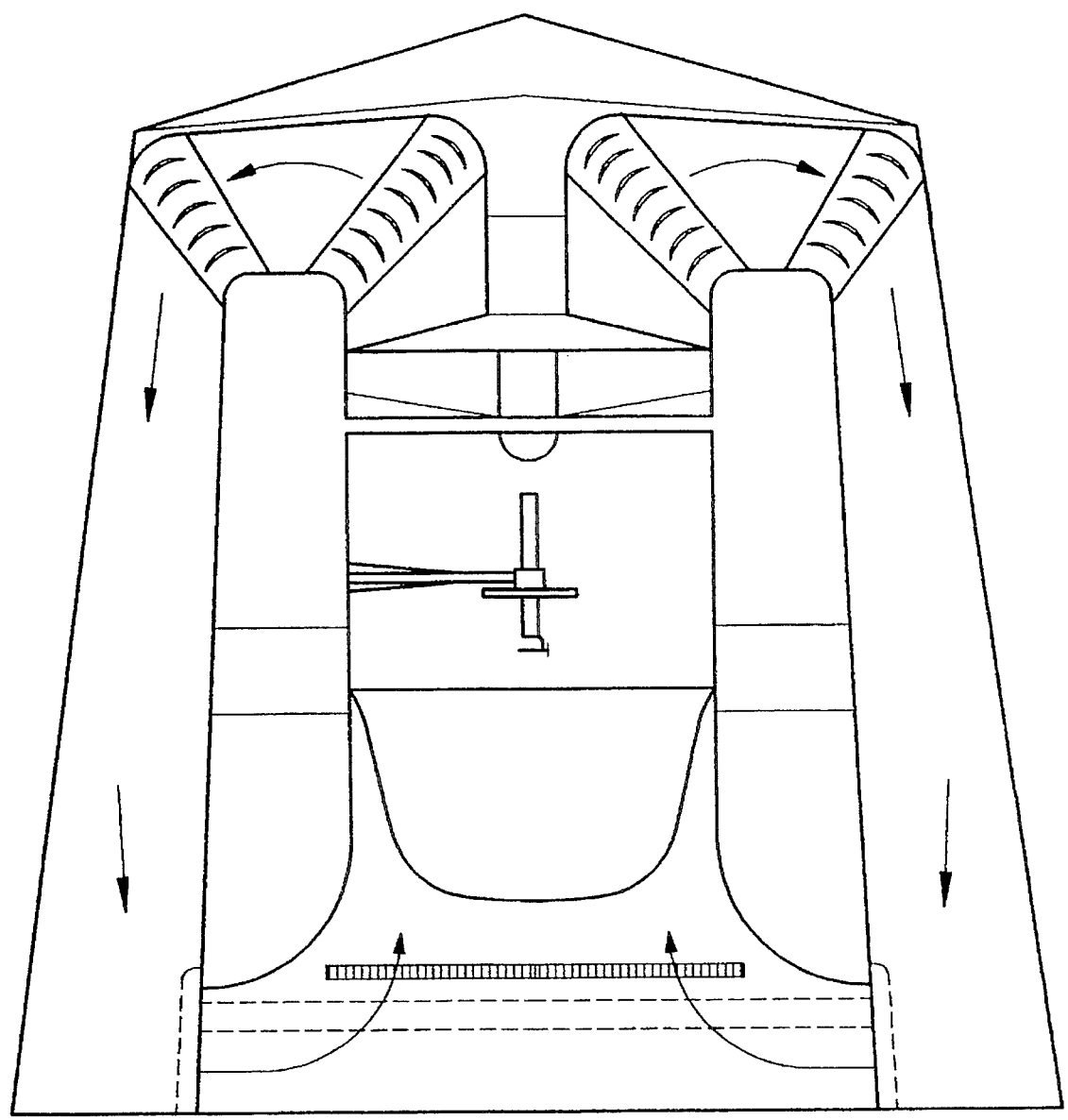
FIG. 1 is an elevational view of the invention installed in a wind tunnel.
Figure 2:
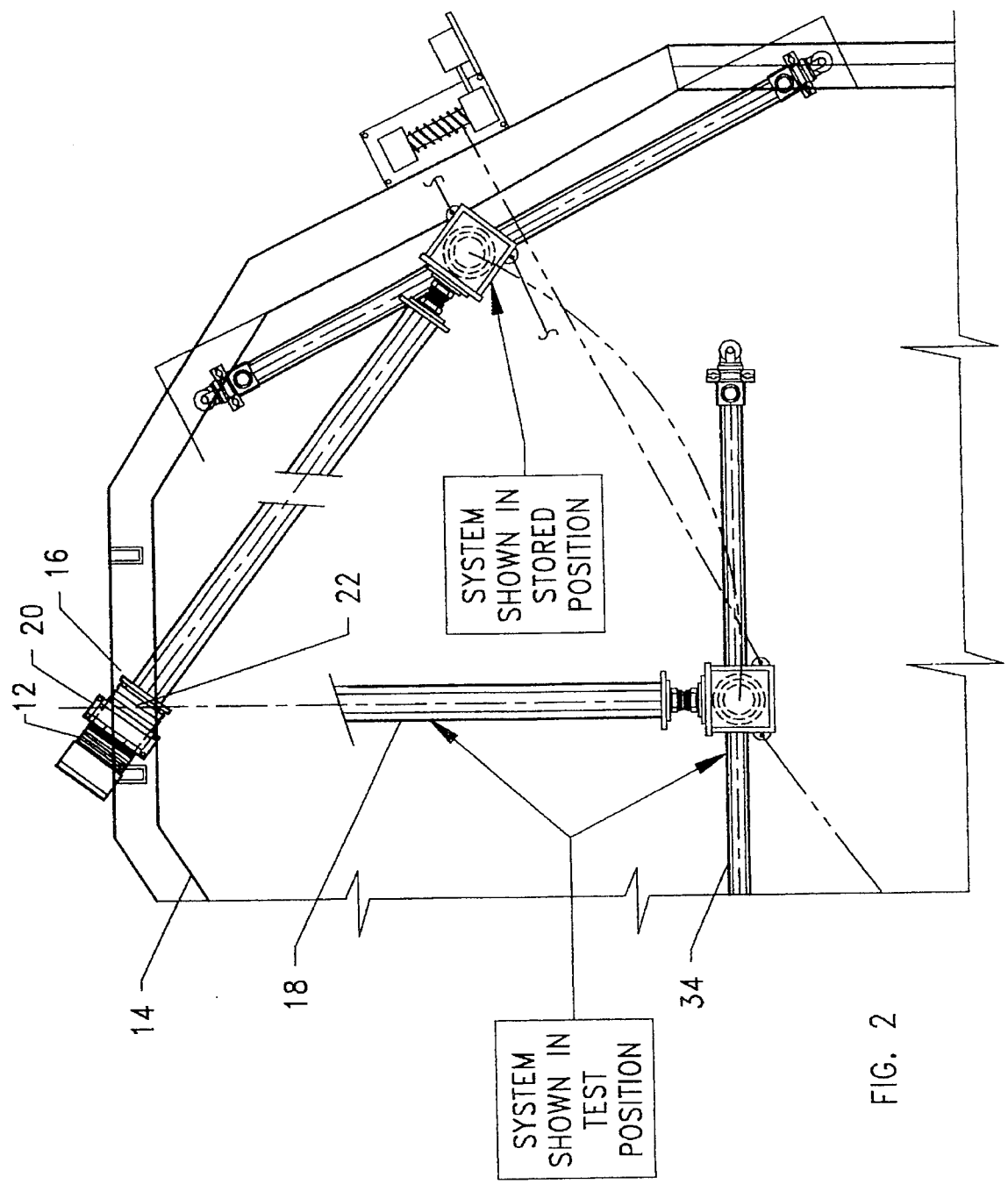
FIG. 2 is a plan view of the invention.

One embodiment of the invention provides translational and rotational braking forces for an airplane model support system in a wind tunnel where the model is tested for aerodynamic and centrifugal loads during spin conditions. The system is mounted within a vertical spin wind tunnel such that the model is positioned in the center of the vertical upward air flow as shown in FIG. 1. This mount consists of a hinge connection at the tunnel structure that provides a rigid anchor for the system. The hinge connection also permits the system to be rotated to a stored position along the tunnel wall during free spin testing as shown in FIG. 2.

Figure 3:
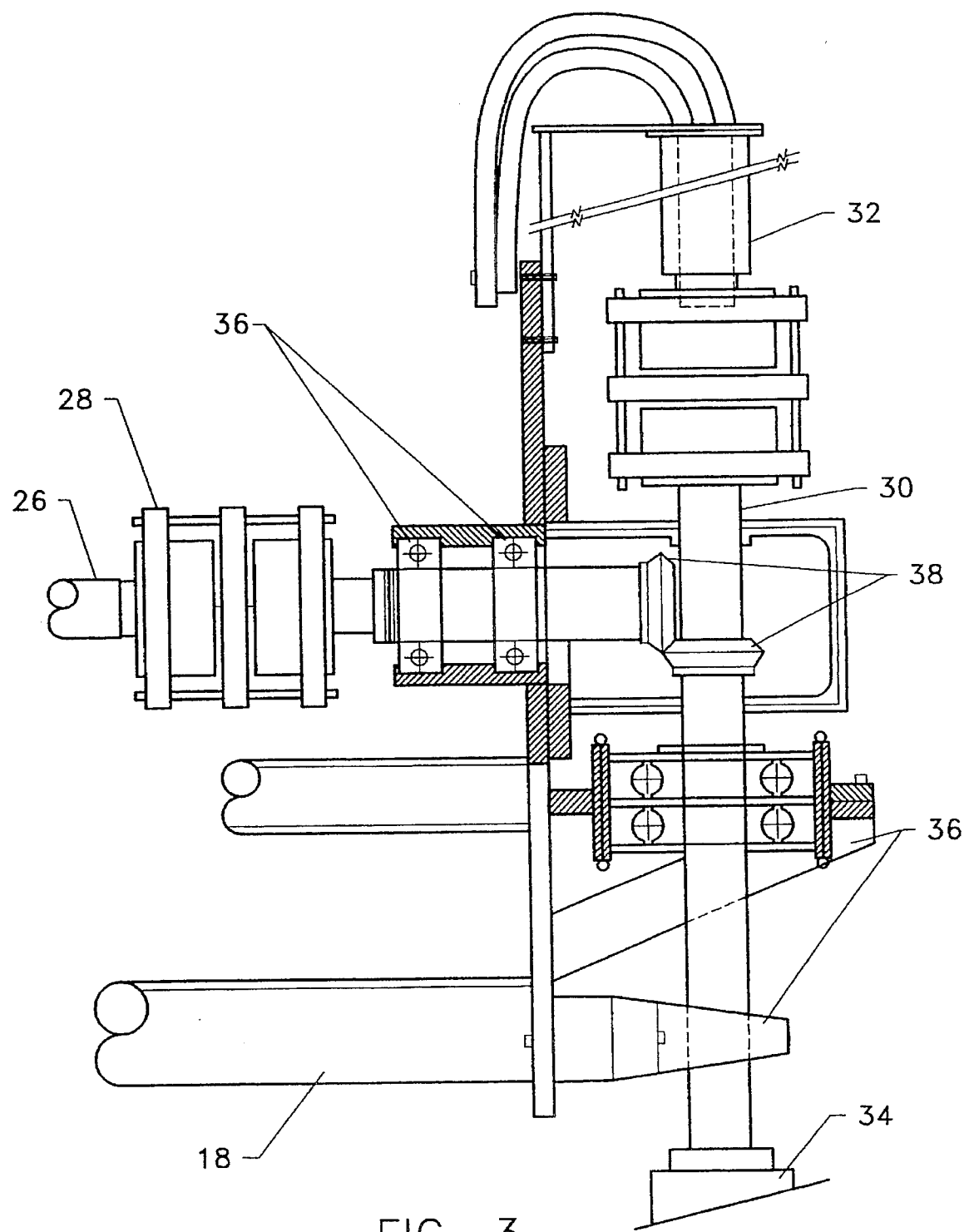
FIG. 3 is a side view of the center drive shaft portion of the invention.

A spin drive motor 12 is located behind the tunnel sidewall 14 near the hinged connection 16 and rotates with the boom 18 as it is moved into the center of the test section from the stored position. A gear box speed reducer 20 is also mounted on the pivoted structure. A flexible coupling 22 is used between the gear reducer output shaft 24 and the drive shaft 26. A shear pin (not shown) is also incorporated at this connection to prevent system damage in instances when large accelerations and decelerations may occur due to motor or speed reducer failures. Flexible couplings 28 are also used on the opposite end (FIG. 3) of the drive shaft 26 to compensate for drive shaft deflection and misalignments. The vertical hollow center shaft 30 provides space for the electrical leads used for power supply, motor control, and for data acquisition from the test model mounted on the end of the sting 31. This rotating hollow center shaft 30 extends to the slip ring assembly 32 at the top and to the horizontal arm 34 located beneath the support boom 18. Bearings 36 are used to minimize rotational loads as the forces are taken out at the 90 degree gear assembly. The bevel gear assembly 38 is housed in an oil bath to reduce frictional loads and wearing of the gear components. All parts below the gear and bearing assembly rotate about the tunnel center line.

Figure 4:
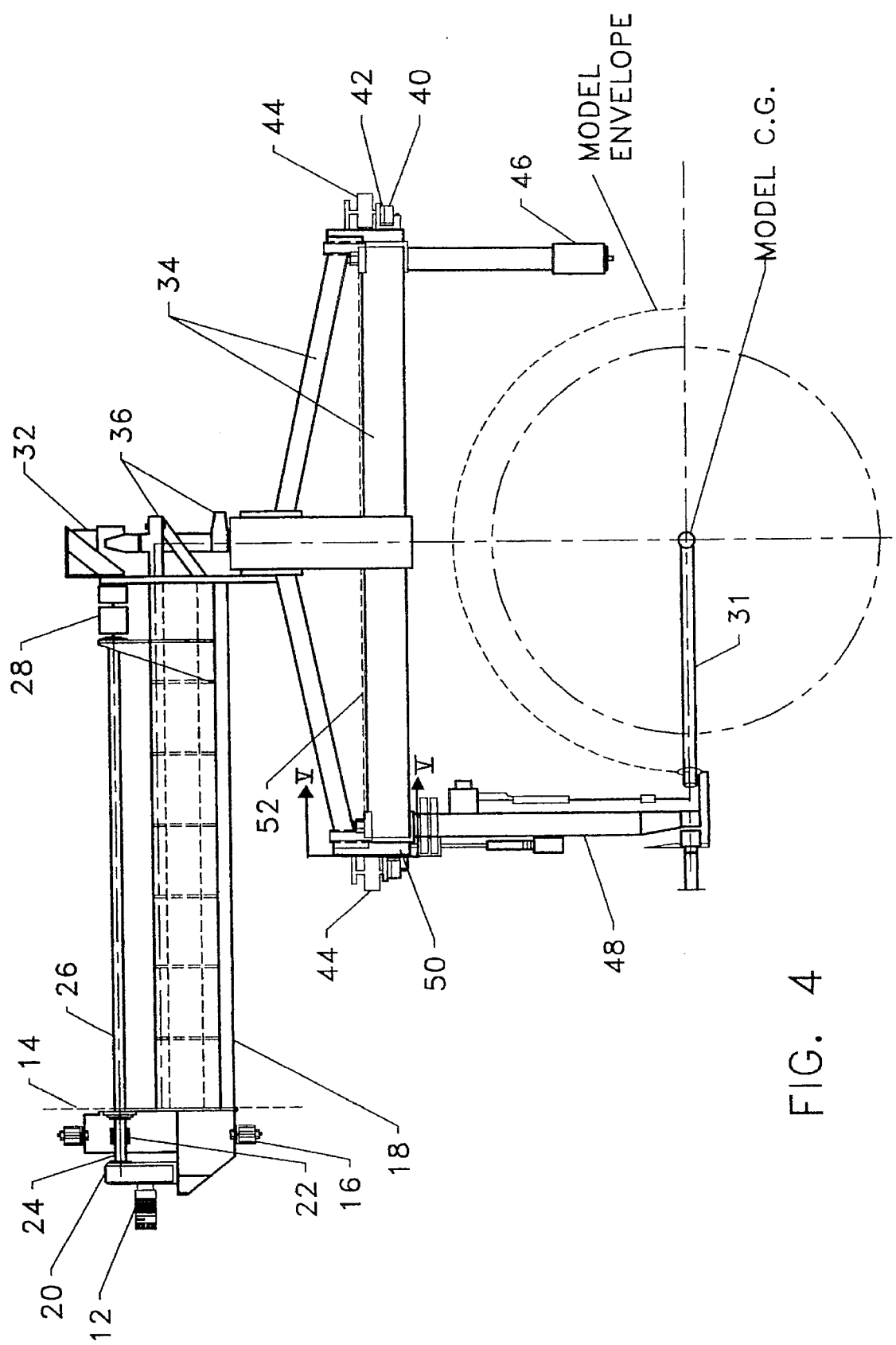
FIG. 4 is an elevational view of the invention.

The horizontal arm assembly 34 (FIG. 4) incorporates many operations with a minimum amount of frontal flow blockage area. Major components of this assembly are the translational drive frameless motor 40, torque multiplier 42, cable drive with pulleys 44, counter weight 46, and the vertical arm support 48. The counter weight 46 and vertical arm subassemblies 50 consist of brakes or clamps driven by linear actuators that apply forces to the horizontal arm 34. Horizontal movement of the vertical arm 48 and counter weight 46 is by use of a single motor and cable system. Since the cable 52 is attached to the near side of the vertical arm support 48 and to the far side of the counter weight 46, both subassemblies move inward simultaneously when the motor turns counter clockwise as viewed from the top. Both units move outward when the motor turns clockwise. This operation maintains a balance of weight and moment about the vertical center line spin shaft. A frameless, compact motor 40 is mounted on the counterweight end of the horizontal arm 34. The motor 40 has a torque multiplier 42 between the motor 40 and the pulley 44 to increase the torque that is applied to the cable drive system.

Figure 5:
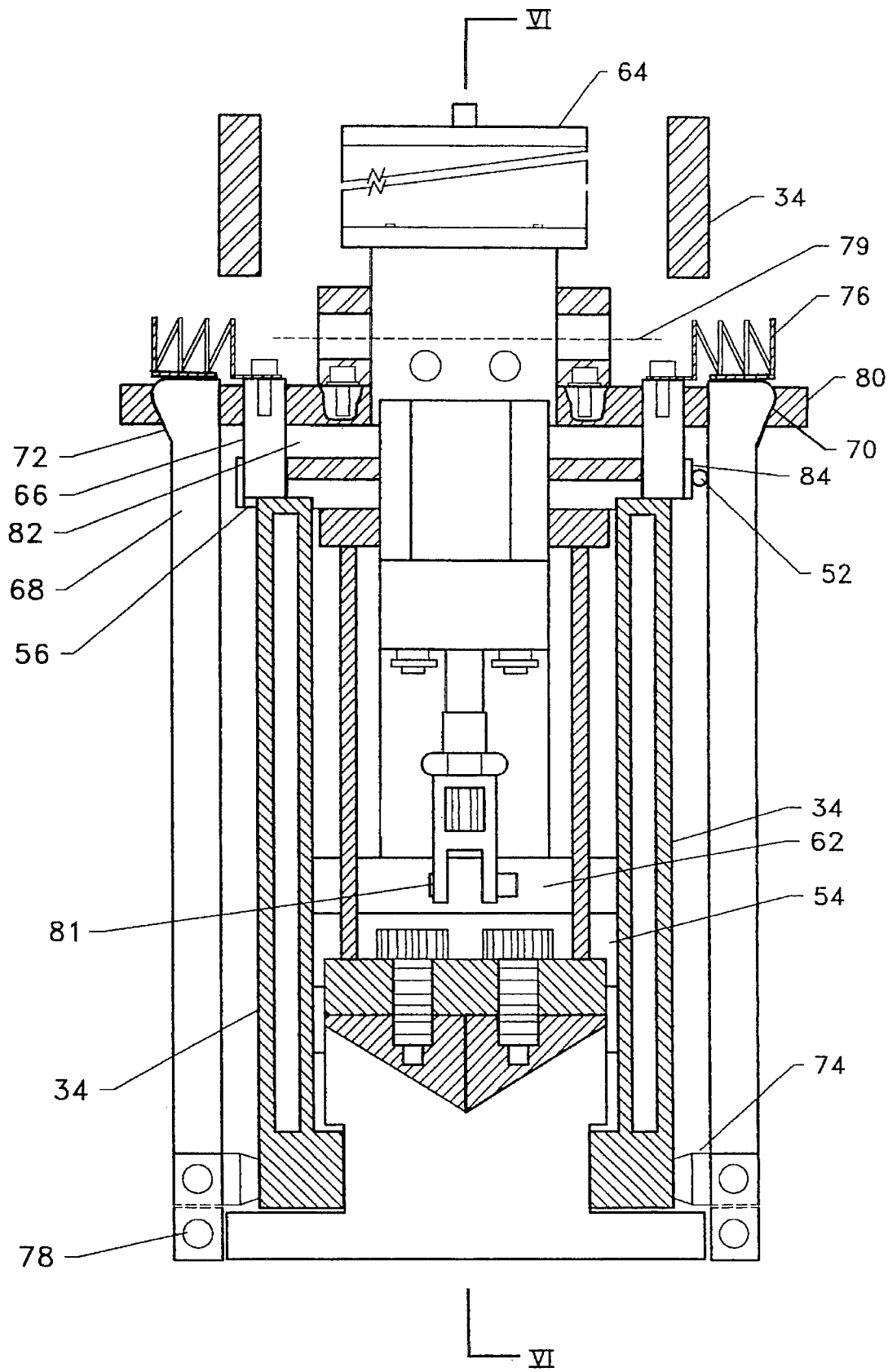
FIG. 5 is a cross-sectional view taken across V—V of FIG. 4.
Figure 6:
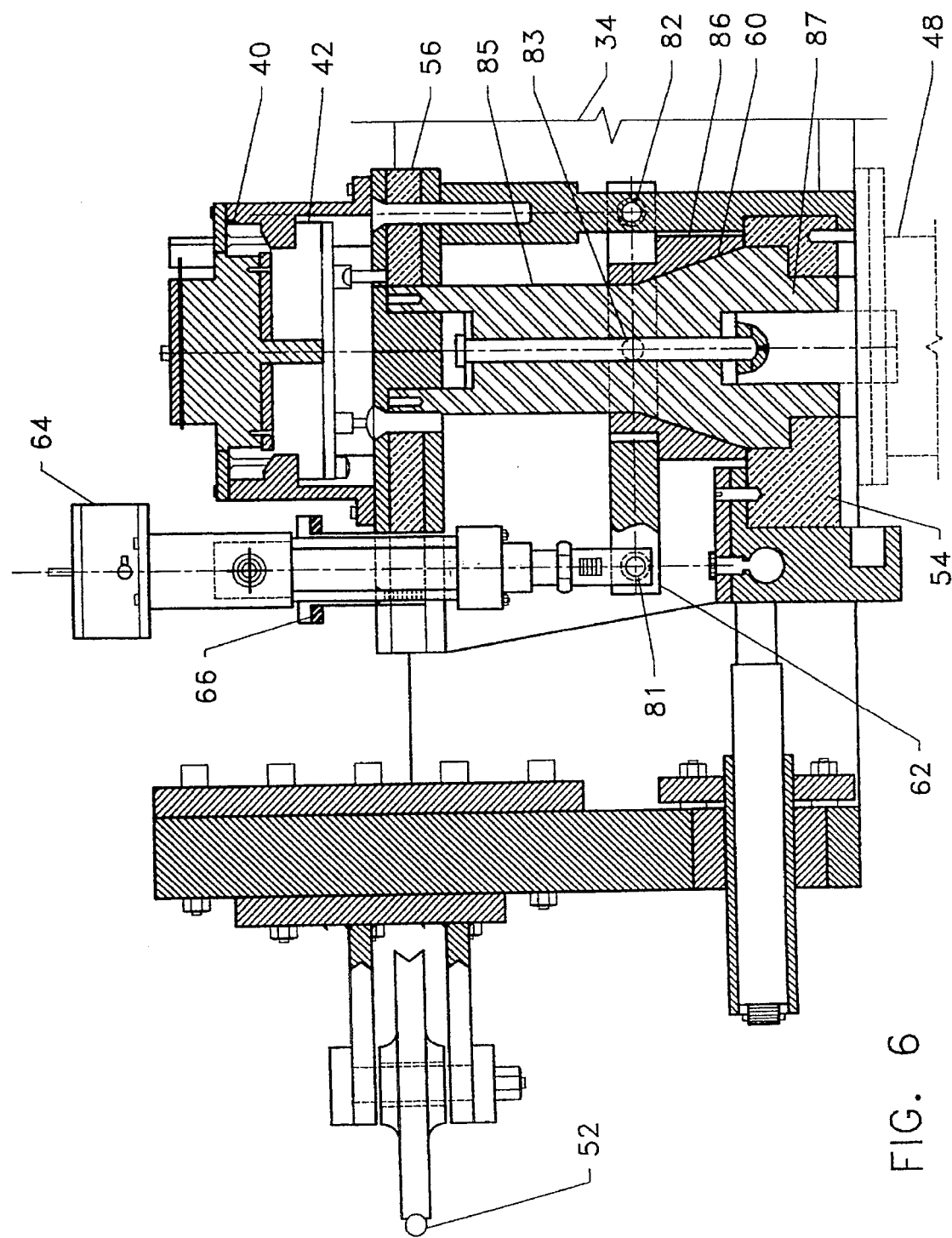
FIG. 6 is a cross-sectional view taken across VI—VI of FIG. 5.

The complete translational/rotational brake is mounted on and moves with the vertical arm subassemblies 50 shown in FIGS. 5 and 6. The vertical arm subassemblies 50 translate on the horizontal arm 34 and are self-contained units. This translational movement is due to external forces such as gravity or centrifugal loads. The resistance to the planned movement is minimized by using a bronze slide bearing 54 that is located at the bottom surface while the top bearing plate 56 supports the top portion of the vertical arm 48. These bearings resist the moment created by the centrifugal force of the vertical arm 48. The motor 40 and torque multiplier 42 rotate the model support to any desired position by providing rotation between the bottom slide bearing 54 and the roll shaft 85 at the bottom and between the top bearing plate 56 and the roll shaft 54 at the top.

When locked, the roll shaft 85 is prevented from rotating by the actuator applied force at the conical surface 60 between the conical outer ring 86 and the roll shaft 85. The yoke 62 is forced downward by the electrical actuator 64. The conical outer ring 86 is forced into contact with the conical portion of roll shaft 85 through the yoke 62 and is allowed to center on the roll shaft 85. The reaction force results in an upward movement of the actuator support and guide 66 until the brake arms 68 are forced inward due to the wedge surfaces 70 and 72. The upward movement of the actuator trunion support 79 and the brake guide 80 creates an air gap 82. The actuator 64 is permitted to rotate on the trunion 79 as the pinned clevis 81 rotates at the yoke center of rotation 82. The conical outer ring 86 is raised at the conical surface 60 from the conical portion 87 of the roll shaft 85 by use of lifting pins 83. The holes in the yoke at this connection are elongated for slight horizontal movement of the yoke during rotation around the yoke center of rotation 82. This reaction forces the brake pads 74 into contact with horizontal arm 34 thus eliminating the need for a second actuator to provide the friction force on the surface of horizontal arm 34 in FIG. 5.

Another feature of this invention is the contact surface between the brake pads 74 and the horizontal arm 34. This surface is not smooth but contains many serrations or teeth that transmit the brake force by shear in the serrations rather than by friction alone. For cases of high centrifugal forces, the normal force between parts will not produce the required frictional force to prevent movement. The shear strength of the metal is required for these cases.

Another feature of this invention is the spring assembly 76 shown in FIG. 5 that forces the surface 70 to stay in contact when the actuator 64 is not in the brake condition. This spring assembly 76 forces the brake arm 68 to rotate at the pins 78 to provide a gap separating the serrations on the horizontal arm 34 and the brake pads 74 to prevent damage during movement of the vertical arm 48 with respect to the horizontal arm 34.

Another feature of this invention is the position of the brake guide 80 during the unload condition. When the brake guide 80 is lowered to the base plate 84, the yoke 62 lifts the conical ring 86 from the roll shaft 85. This feature allows free rotation at surface 60 that minimizes energy to rotate the support when rotation is required.

Although our invention has been illustrated and described with reference to the preferred embodiment thereof, we wish to have it understood that it is in no way limited to the details of such embodiment, but is capable of numerous modifications for many mechanisms, and is capable of numerous modifications within the scope of the appended claims.

We claim:

1. A single action brake apparatus for simultaneously braking translational movement of a translatable housing and rotational movement of a rotatable shaft secured to the housing, the housing being mounted on and translatable along a track, the rotatable shaft having an axis of rotation perpendicular to the track, the brake apparatus comprising:

at least one flat surface brake for braking the translational movement along the track of the translatable housing;

a cone friction brake for braking the rotational movement of the rotatable shaft; and means for applying a force to the cone friction brake in a direction parallel to the axis of rotation of the rotatable shaft, the force causing the cone friction brake to engage and creating a reaction force that causes the flat surface brake to engage.

2. The brake of claim 1 in which the flat surface and the actuator surface are serrated.

3. A single action brake apparatus as in claim 1 wherein the cone friction brake comprises:

a conical brake drum connected to the rotatable shaft; and a conical brake pad ring displacable along the axis of rotation of the rotatable shaft, the conical brake pad ring being displaced by the force created by the means for applying the force to the cone friction brake.

4. A single action brake apparatus as in claim 1 wherein the flat surface brake comprises:

a brake guide connected to the means for applying a force to the cone friction brake, the brake guide being displacable along the axis of rotation of the rotatable shaft, and the brake guide having at least one wedge shaped groove;

a brake arm pivotally attached to the translatable housing at one end and the brake arm connected to the brake guide at the opposite end by having a wedge shape that matches the wedge shaped groove in the brake guide so that when the brake guide is displaced along the axis of rotation of the rotatable shaft by the reaction force created by the means for applying the force to the cone friction brake, the wedge shaped groove of the brake guide moves against the wedged end of the brake arm causing the brake arm to pivot; and a brake pad connected to the brake arm that engages the track when the brake arm pivots.

5. A single action brake apparatus as in claim 4 wherein the means for applying the force to the cone friction brake comprises:

a linear actuator connected to the brake guide so that the reaction force caused by the linear actuator displaces the brake guide and causes the flat surface brake to engage.

6. A single action brake apparatus as in claim 1 wherein the means for applying the force to the cone friction brake comprises:

a linear actuator connected to the flat surface brake so that the reaction force caused by the linear actuator causes the flat surface brake to engage.

* * * * *